United States Patent Office.

DAVID STEWART, OF KITTANNING, ASSIGNOR TO HIMSELF AND SAMUEL M. KIER, OF PITTSBURG, PENNSYLVANIA.

Letters Patent No. 99,368, dated February 1, 1870.

IMPROVEMENT IN THE MANUFACTURE OF IRON.

The Schedule referred to in these Letters Patent and making part of the same.

*To all whom it may concern*.

Be it known that I, DAVID STEWART, of Kittanning, in the county of Armstrong, and State of Pennsylvania, have invented a certain new and useful Improvement in the Manufacture of Iron, the same being an improvement on the process for which Letters Patent of the United States were granted to me, dated July 13, 1869, and numbered 92,667; and I do hereby declare that the following is a full, clear, and exact description thereof.

The nature of my invention consists in the hereinafter-described method and process for manufacturing "blooms," the constituent parts of which are partially-purified and partially-converted cast-iron.

To enable others skilled in the art to manufacture blooms by my method and process, I will proceed to describe more fully the same.

I use the apparatus and bloom or ingot-moulds, with all their appendages, as described in the schedule, and represented in the drawings, which form part of Letters Patent granted me, July 13, 1869, No. 92,667.

I also use molten cast-iron, and pulverized iron-ore, or other metallic oxides, and manipulate, mix, and combine them for forming blooms and ingots, in the same manner and by the means as described in the aforesaid Letters Patent.

But, in addition to the pulverized iron-ore, I use wood, charcoal, coke, bituminous coal, anthracite coal, or any similar carbonaceous matter, which may be found to act in and on the molten iron as a heating and a detersive agent or agents.

I pulverize or break up the several articles named into suitable-sized lumps or particles, and mix them with the pulverized iron-ore, or I use them in combination with the pulverized iron-ore, either separately or combined; that is to say, in forming the blooms, I use the wood charcoal alone for mixing with the particles of molten iron, or, in like manner, any one of the other-named substances, or I combine two or more of the aforesaid substances, as charcoal and coke, or charcoal, coke, and bituminous coal, or bituminous coal and anthracite coal, or any other combination of the aforesaid substances which may be found desirable for mixing with the falling particles of molten iron, as described in the hereinbefore-mentioned patent.

The object of using the charcoal, coke, bituminous coal, anthracite coal, or like carbonaceous substances, combined, in connection with the method and process for manufacturing blooms, described in my aforesaid patent, is twofold, viz:

First, to make a spongy or porous bloom or ingot, and thereby cause the fire to more easily penetrate them, and thus avoid the wasting action of the fire upon them when being reheated, in the further process of manufacturing them into other forms of merchantable iron or steel, and also for facilitating the reheating of them.

Second, to combine with said bloom or ingot, in the process of its manufacture, said material or combination of said materials, as will act as a fluxing, purifying, detersive, and converting-agent or agents, and at the same time be transmuted into an inflammable gas or matter, which will facilitate the reheating of the blooms or ingots, for the further process of working them by the squeezing, hammering, or rolling-process.

I have found that sulphur will answer a good purpose for some kinds of cast-iron, and that it may be used in the same manner as any of the other substances named.

Having thus described the nature and operation of my improvement in method and process for manufacturing blooms or ingots, to be used in the manufacture of iron and steel, I do not claim, broadly, the mixing of anthracite, or other carbonaceous matter, with molten cast-iron, so as to form a solid conglomerate of cast-iron and carbonaceous matter; but

What I claim as of my invention, is—

The use of charcoal, coke, bituminous and anthracite coals, or their equivalents, separately or combined, when used in combination with the process described in Letters Patent, granted to me on the 13th day of July, 1869, for the manufacturing of blooms or ingots.

DAVID STEWART.

Witnesses:
JAMES J. JOHNSTON,
J. H. PHILLIPS.